United States Patent [19]

Tuley, Jr. et al.

[11] Patent Number: 4,582,672

[45] Date of Patent: Apr. 15, 1986

[54] METHOD AND APPARATUS FOR PREVENTING INADVERTENT CRITICALITY IN A NUCLEAR FUELED ELECTRIC POWERING GENERATING UNIT

[75] Inventors: Charles R. Tuley, Jr., Penn Township, Westmoreland County; Douglas A. Bauman, Murrysville; Michal M. Feilchenfeld, Pittsburgh; Lesley Greenberg, Monroeville; James A. Neuner, Gibsonia, all of Pa.

[73] Assignee: Westinghouse Electric Corp., Pittsburgh, Pa.

[21] Appl. No.: 407,231

[22] Filed: Aug. 11, 1982

[51] Int. Cl.⁴ .............................................. G21C 17/00
[52] U.S. Cl. .................................... 376/254; 376/255; 376/215
[58] Field of Search ........ 376/254, 255, 259, 214–218; 250/390–392

[56] References Cited

U.S. PATENT DOCUMENTS

| | | | |
|---|---|---|---|
| 3,188,470 | 6/1965 | Ricker et al. | 376/255 |
| 3,366,544 | 1/1968 | Bunch | 376/214 |
| 3,424,653 | 1/1969 | Cohn | 376/214 |
| 3,839,159 | 10/1974 | Dunnavant et al. | 376/328 |
| 3,998,693 | 12/1976 | Musick | 376/217 |
| 4,073,683 | 2/1978 | van der Schoot | 376/328 |
| 4,104,117 | 8/1978 | Parziale et al. | 376/214 |
| 4,225,390 | 9/1980 | Brown et al. | 376/328 |
| 4,297,581 | 10/1981 | Brunson et al. | 250/392 |
| 4,305,786 | 12/1981 | Schultz | 376/254 |
| 4,427,620 | 1/1984 | Cook | 376/216 |

FOREIGN PATENT DOCUMENTS

| | | |
|---|---|---|
| 2137504 | 2/1973 | Fed. Rep. of Germany ...... 376/254 |
| 827436 | 2/1960 | United Kingdom . |
| 975742 | 11/1964 | United Kingdom . |
| 1047152 | 11/1966 | United Kingdom . |
| 1498372 | 1/1978 | United Kingdom . |
| 1534148 | 11/1978 | United Kingdom . |
| 1577823 | 10/1980 | United Kingdom . |
| 2050022 | 12/1980 | United Kingdom . |
| 2020042 | 9/1982 | United Kingdom . |
| 2074721 | 9/1983 | United Kingdom . |

Primary Examiner—Salvatore Cangialosi
Attorney, Agent, or Firm—Daniel C. Abeles

[57] ABSTRACT

An inadvertent approach to criticality in a nuclear fueled electric power generating unit is detected and an alarm is generated through on-line monitoring of the neutron flux. The difficulties of accurately measuring the low levels of neutron flux in a subcritical reactor are overcome by the use of a microcomputer which continuously generates average flux count rate signals for incremental time periods from thousands of samples taken during each such period and which serially stores the average flux count rate signals for a preselected time interval. At the end of each incremental time period, the microcomputer compares the latest average flux count rate signal with the oldest, and preferably each of the intervening stored values, and if it exceeds any of them by at least a preselected multiplication factor, an alarm is generated. The interval and multiplication factor are chosen such that an alarm is generated early enough in the event to provide adequate time for an automatic system or the operator to take action which prevents the reactor from going critical yet minimizes the likelihood of a spurious response. As applied to a pressurized water reactor system, boron dilution events are detected in time that the chemical and volume control system can be isolated and the valves for the refueling water storage tank can be opened to inject highly borated water into the reactor coolant system to keep the reactor subcritical.

19 Claims, 7 Drawing Figures

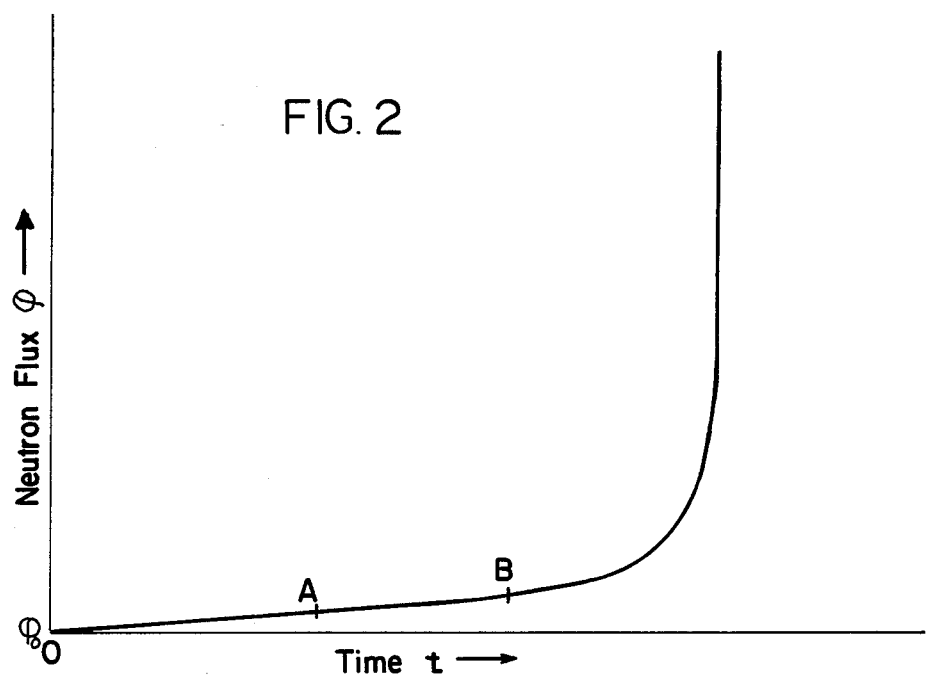
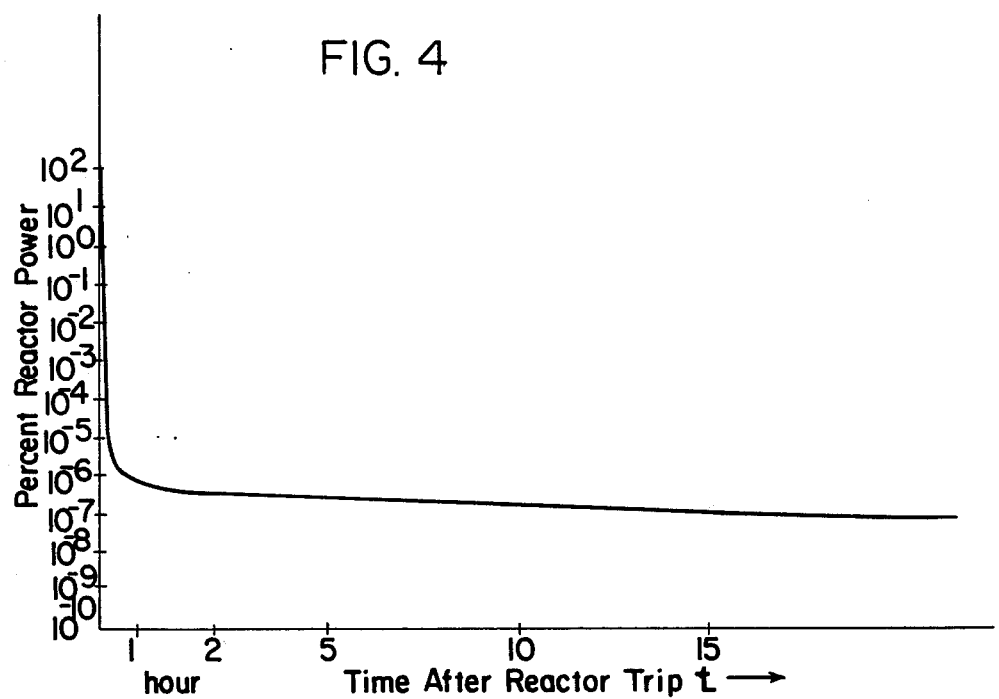

METHOD AND APPARATUS FOR PREVENTING INADVERTENT CRITICALITY IN A NUCLEAR FUELED ELECTRIC POWERING GENERATING UNIT

BACKGROUND OF THE INVENTION

1. Field of the Invention

This invention relates to the detection of conditions which would lead to inadvertent criticality in pressurized water reactor (PWR) and boiling water reactor (BWR) nuclear fueled electric power generating units and to providing automatic response, and/or an alarm to which the operator can respond, to terminate the event. It has particular application to the detection of inadvertent boron dilution in a shutdown PWR.

2. Description of the Prior Art

It is imperative that a nuclear reactor which has been shutdown remain subcritical and not inadvertently return to power. Such an event could occur for instance through failure of a component in the complex control system or inadvertent action taken by the operator. In any case, during such an event the reactor approaches criticality exponentially with respect to time thus making it more difficult for the operator to detect the event and take appropriate action before the reactor. The situation is further compounded by a relatively small shutdown margin (the percentage of the reactivity below critical) that can exist when the reactor is shutdown. The status of the core shutdown margin is monitored by monitoring the neutron flux, however, at low neutron count rates the neutron flux count rate becomes a random event with frequent bursts of neutrons occurring between periods of little or no activity. Considering also the fact that the signal level of the neutron flux detector for low count rates is low compared to the considerable noise signal present, and further that the processed signal from the detector is a logarithmic and not a linear function of the neutron count rate, it can be appreciated that it is very difficult to detect an inadvertent approach to criticality early in the event and at the same time avoid spurious alarms.

Both BWR and PWR units utilize control rods which are inserted into and withdrawn from the reactor core to regulate reactor reactivity through controlled absorption of the neutrons released by the fission process. In addition, PWR units employ boron, also a neutron absorber, dissolved in the reactor coolant water, to regulate reactivity in conjunction with rod control. In fact, long duration changes in reactivity are normally established through the boron control system. When the reactor is to go to power, the boron concentration in the reactor coolant water is diluted at a controlled rate. Similarly, when the reactor is shutdown, boron concentration is increased to establish the shutdown margin. During refueling operations, the reactor vessel is filled with heavily borated water while spent fuel assemblies are removed from the core and replaced by fresh fuel assemblies.

The boron control system includes a number of tanks, pipes, valves and controls which make up borated water of regulated concentrations from boric acid and fresh water for regulating reactivity insertions and for use during refueling. The heavily borated water in the refueling water tank is also available for use in the safety injection system should the normal control systems be unable to shutdown the reactor when predetermined limiting operating parameters are approached.

While under normal operating conditions the boron concentration in the reactor coolant system is closely controlled, it is possible that it could become inadvertently diluted such as mentioned above through component failure or inadvertent operator action. If this occurs when the reactor is at power or during startup, currently provided protection system actions such as the high neutron flux reactor trip and the rod insertion limit alarm warn the operator of the condition, and in some cases, initiate corrective action. Inadvertent dilution during refueling is prevented by locking closed the valves through which dilution water would have to flow thereby isolating the reactor coolant system.

None of the present reactor protection systems are suitable for detecting inadvertent boron dilution events, when the reactor is shutdown, in time to prevent the reactor from going critical. While inadvertently going critical due to boron dilution is not totally unacceptable in itself since as the reactor power increases competing effects such as a rise in fuel temperature will cause the reactor to go subcritical and then oscillate between critical and subcritical, the pressure transients generated during these excursions are unacceptable.

SUMMARY OF THE INVENTION

According to the invention, an inadvertent approach to criticality of a shutdown nuclear reactor is detected before the reactor goes critical by monitoring the instantaneous neutron flux count rate. Since the neutron flux count rate is a statistically varying signal at low count rates, average neutron flux count rate signals are generated representative of the average value of the flux count rate over an incremental time period. Average flux count rate signals separated in time by a preset time interval are compared and if the latest average neutron flux count rate signal exceeds the earlier one by more than a preselected multiplication factor, an alarm signal is generated.

The preset time interval between the average flux count rate signals and the preselected multiplication factor are selected on the basis of a number of interacting criteria. The multiplication factor should be large enough that spurious alarms are not generated. Yet if it is too large, an alarm will not be generated until too late in the event to prevent the reactor from going critical since the neutron flux count rate in such an event increases exponentially with respect to time. When a smaller multiplication factor is selected, the time interval must be lengthened, but too long an interval will cause an alarm to be generated under some circumstances of normal operation. In addition, if too long an interval is selected, conditions under which the two average flux count rate signals are generated, such as the temperature in a PWR plant, can change, making the calculations more difficult. It has been determined that a multiplication factor of between 1.5 and 3.0 and preferably 2.0, with an interval of 5 to 20 minutes and preferably 10 minutes provides good response without unduly limiting normal operation or generating spurious alarms.

In the preferred embodiment of the invention, the average neutron flux rate signal is generated repetitively and continuously, and the sequentially generated values are stored for the preselected time interval. In this configuration, the latest average flux count rate signal is not only compared with the average neutron flux count rate signal which was generated the preselected interval earlier, but with each of the intervening average neutron flux count rate signals. In this manner, any sudden increase in flux count rate is detected earlier and it also permits detection of the occurrence of an event which could lead to a return to criticality at least as early as one hour after a reactor trip when the neutron count rate has approximately leveled out.

The average neutron flux count rate signal is generated by generating a running total of the value of the instantaneous flux count rate signal at a plurality of equally spaced instants in time and then dividing the total by the number of instants. This can best be carried out by a programmed digital computer and particularly by the microcomputer available today. In the specific embodiment of the invention disclosed the average neutron flux count rate signals are generated over incremental time periods of one minute so that 10 such signals are stored and compared with the latest average signal.

The invention has particular application to the detection of inadvertent boron dilution in PWR units although it is also useful in detecting other events which could cause a reactor to inadvertently go critical. In this application, the multiplication factor and interval are selected so that the system responds to inadvertent boron dilution events no matter how large or small the rate of dilution and does so in time to permit steps to be taken to prevent the reactor from going critical. When an alarm signal is generated, valves can be closed to discontinue the flow of borated water from the normal boron control system and open valves to introduce into the reactor coolant system highly borated water, meaning water which has a boron concentration high enough to maintain the reactor in a subcritical state. Such highly borated water is normally available in the refueling water storage tank. The valves can be acuated in response to the alarm signal manually by the operator or automatically.

The invention encompasses both the method of detecting an inadvertent approach to criticality, and the apparatus for implementing the method.

BRIEF DESCRIPTION OF THE DRAWINGS

FIG. 2 is a graphical representation of the neutron flux as a function of time during a typical approach to criticality of the reactor illustrated in FIG. 1 assuming a constant positive reactivity insertion such as would occur as a result of an inadvertent boron dilution event;

FIG. 4 is a graphical representation of the neutron flux as a function of time for the reactor of FIG. 1 following a reactor trip;

DESCRIPTION OF THE PREFERRED EMBODIMENT

Figure 1:
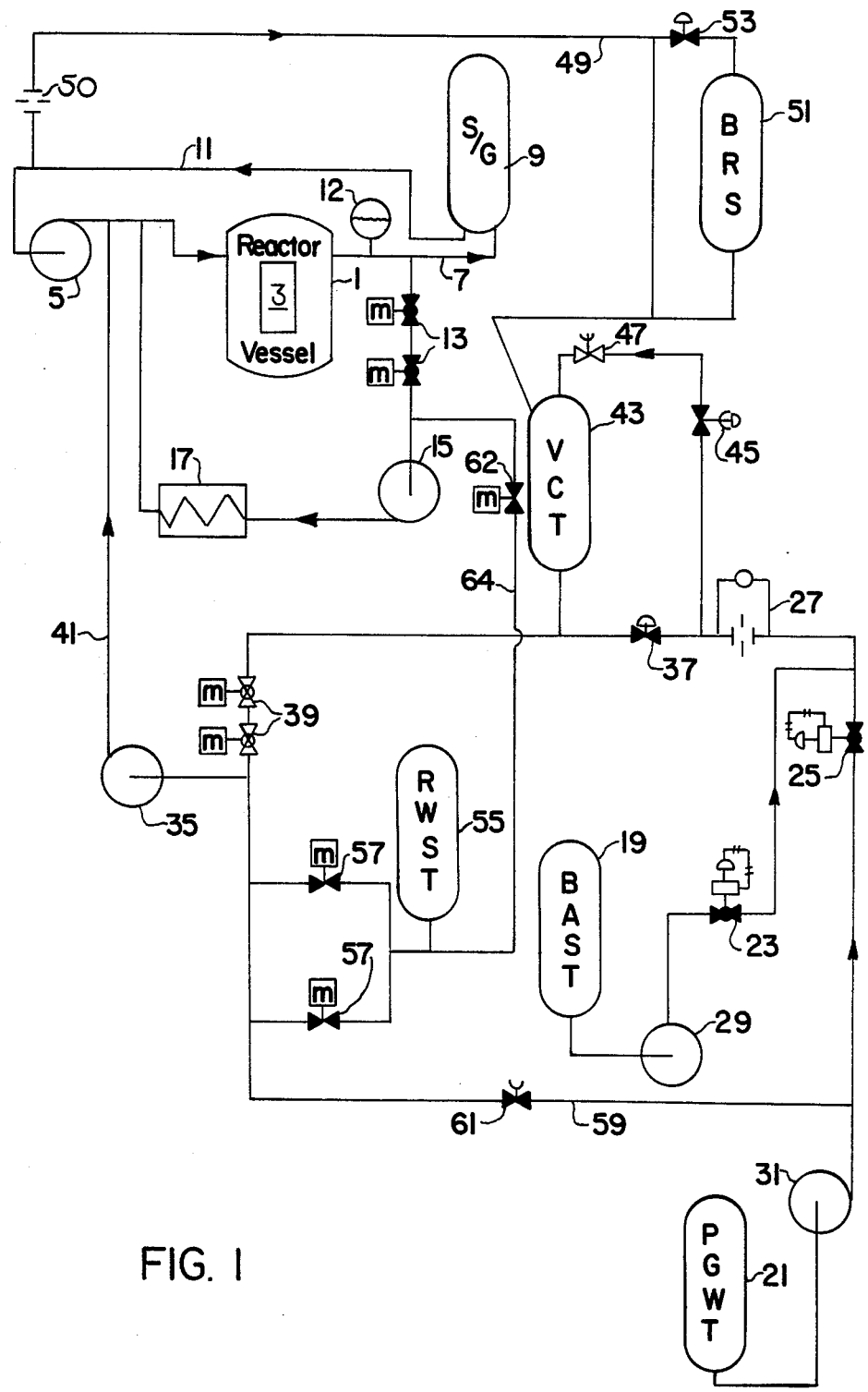
FIG. 1 is a schematic diagram of the nuclear steam supply system and the boron control system of a pressurized water reactor, nuclear fueled electric power generating unit embodying the invention.

While the invention is suitable for detecting events which could lead to an inadvertent return to criticality of a shutdown nuclear reactor in a boiling water reactor (BWR) plant or a pressurized water reactor (PWR) plant, it will be described as applied to a PWR plant where it is especially useful in detecting inadvertent boron dilution events. As shown in FIG. 1, such a system includes a reactor vessel 1 which contains a core 3 of fissionable material. Reactor coolant, in the form of borated, pressurized water, is circulated through the reactor vessel 1 and core 3 where its temperature is raised by the heat generated by the fission reaction. The heated reactor coolant is pumped by reactor coolant pump 5 through a hot leg conduit 7 to a steam generator 9 which utilizes the heat to generate steam which in turn drives a turbine-generator unit (not shown) through a secondary loop (not shown) to generate electric power. The coolant is then returned to the reactor vessel 1 and core 3 through a cold leg conduit 11 which includes the reactor coolant pump 5. While only one loop for the reactor coolant, including a hot leg, a cold leg, a steam generator and a reactor coolant pump is shown in FIG. 1, up to four such loops, all connected to the one reactor vessel and known as primary loops, may be included in a PWR plant. A pressurizer 12 maintains the pressure of the reactor coolant in the primary loops.

Because the steam generators 9 are inefficient at absorbing heat at low temperature levels in the reactor coolant system such as when the reactor is shutdown and temperature is less than 350° F., the reactor coolant is rerouted under these conditions through a residual heat removal loop which includes a pair of series connected normally closed, motor operating valves 13, a residual heat removal pump 15 and a heat exchanger 17. Again, while only one residual heat removal loop is shown in FIG. 1, two such loops are provided in commercial installations with one or two loops operating depending upon the conditions of the reactor and the heat exchangers.

The reactivity of the reactor core 3 is controlled by a control rod system (not shown) which regulates the degree of insertion of neutron absorbing rods into the reactor core and a boron control system which regulates the concentration of boron, a neutral absorber, in the reactor coolant water. A change in the position of the control rods affects the reactivity of the reactor core immediately, but they tend to distort the distribution of power generation axially through the core since they are inserted and withdrawn from the top of the reactor vessel 1. On the other hand, since the boron control system acts through the reactor coolant which is circulated throughout the reactor core 1, it does not distort power distribution; however, as a consequence of the large volume of reactor coolant that must be borated or diluted, it requires a substantial amount of time to effect a power change. As a result, rod control and boron control are normally coordinated with equilibrium for long term power changes being set by the boron control system.

The boron control system generates borated water of the desired boron concentration by mixing boric acid stored in a boric acid storage tank (BAST) 19 with water of a specified chemical purity, known in the trade as primary grade water, which is stored in the primary grade water tank (PGWT) 21. The desired mixture is achieved by a blender which includes two normally closed, motor operated flow control valves, the boric acid flow control valve 23 and the primary grade water control valve 25, and a flow meter 27. The blender also includes a controller (not shown) which responds to the flow indicated by the flow meter 27 and sets the openings of the motor operated valves 23 and 25 to mix boric acid pumped from the boric acid storage tank 19 by boric acid transfer pump 29 with primary guide water pumped from the primary grade water tank by primary grade charging pump 31. Borated water which passes through valve 37 and chemical and volume control system valves 39 is pumped by charging pump 35 into cold leg 11 through conduit 41. Borated water can also be divered into the VCT tank 43 through valves 45 and 47. Borated water from the cold leg 11 is circulated through conduit 49, and if necessary through the boron recovery system (BRS) 51 via valve 53, to the VCT 43 and then back through valves 39, charging pump 35 and conduit 41 to the cold leg 11. Highly borated refueling water is stored in refueling water storage tank 55. A pair of valves 57 in parallel lines control the flow of refueling water to the charging pump 35. During refueling, motor operated valve 62 is opened so that the highly borated refueling water can be pumped by the residual heat removal pump 15 from the refueling water storage tank 55 through the fill line 64 to the reactor vessel. The volume of this tank is sufficient to hold enough highly borated water to submerge the core under several feet (greater than 12 feet) of borated water and to fill the refueling cavity and canal. This large volume of highly borated water is also used in the safety injection system. Should conditions warrant such action as determined by the Engineered Safety Features Actuation System, this large volume of highly borated water is injected into the reactor coolant system through valves 57 by charging pump 35 to rapidly render the reactor subcritical. The boron control system also includes a line 59 leading directly from the primary grade charging pump 31 to the charging pump 35. This line is not used during normal operations and flow through it is blocked by a normally closed hand operated valve 61.

During normal operation of the boron control system, boric acid from the boric acid storage tank 19 is mixed in the blender with the primary grade water from tank 21 and injected into the reactor coolant system by charging pump 35. The boron concentration of the charged water is lower than that in the reactor coolant system if reactor reactivity is to be increased and higher if the reactivity is to be reduced. If a large increase in reactivity is called for, unborated primary grade water is introduced into the reactor coolant system to decrease the overall boron concentration to the desired level. It is possible, however, that the controller, the boric acid control valve 23, primary grade water control valve 25, the boric acid transfer pump 29, the boron removal system 51, and/or any of the valves 37, 45 or 53 could fail. It is also possible that the valve 61 could be inadvertently opened, that the operator could make an error in setting the controller or an improper concentration of boric acid could be mixed in the boric acid storage tank 19. Any of these events could lead to an improper boron concentration in the borated water charged into the reactor coolant system and in some cases, the injection of unborated water when not appropriate. If the error is such that the boron concentration is higher than it should be, no permanent harm is done. However, if the boron concentration is lower than conditions calls for, thereby diluting the boron concentration of reactor coolant, positive reactivity will be inadvertently inserted into the reactor.

If a boron dilution event occurs when the reactor is at power or the reactor is intentionally approaching criticality and is under close operator control, inadvertent boron dilution does not cause great concern for several reasons. First, the control rods are withdrawn, thereby providing means for a rapid reactor shutdown. Also, the system is flexible at the reactor coolant temperatures encountered when at power since a steam bubble is present in the pressurizer 12 and the pressurizer fluid level is reasonable so that the pressure surges caused by boron dilution are more easily tolerated. In addition, the reactor coolant pressure relief systems are able to handle the peaks of the transient not absorbed by the pressurizer. Furthermore, many alarms are available for notifying the operator in sufficient time for a suitable response Finally, the effects of boron dilution transients at power are bounded by other analyses. Normally, inadvertent boron dilution is not a problem during refueling because the valves in the possible dilution flow paths are locked closed.

The difficulty with inadvertent boron dilution arises when the reactor is intended to remain subcritical. This includes the hot standby mode in which the average reactor coolant temperature is at or above about 350° F. but no thermal power is being generated, the hot shutdown mode in which this temperature is between 200° and 350° F. and the cold shutdown mode in which the temperature is equal to or less than 200° F. While inadvertent criticality will lead to competing effects which will cause the reactor to go subcritical, and if left alone, to oscillate between subcritical and critical at a low power level, this situation creates a small potential for fuel damage due to power/flow mismatch and for an excursion into a departure from nucleant boiling (DNB). It also creates the potential for overpressurization of the reactor coolant system due to rapid increase in temperature and inability of the overpressurization protection system to cope with the transient.

The worst situation for a boron dilution event occurs when the residual heat removal system (RHR) is in operation. This is so because of the relatively small volume of the reactor coolant system when on RHR (typically about 2500-4000 ft.$^3$). The RHR flow rates are also small (typically about 3500-4000 gpm.) resulting in long loop transport times (for instance, about 5 to 7 minutes). This creates a potential for slug flow of the diluting water with limited mixing, resulting in step changes in reactivity, instead of uniform flow and mixing with ramp changes in reactivity.

Additional difficulty with boron dilution when on RHR is that at the lower reactor coolant temperatures encountered under these circumstances, the reactor coolant system in inflexible, it is either solid or only a hard (e.g. nitrogen) bubble is present in the pressurizer. Furthermore, the pressure relief systems are potentially unable to handle the pressure transients generated since they are designed to respond to other events. Also, when on RHR, the reactor coolant system pressure is low, resulting in high injection rates from the centrifugal charging pumps (typically, about 300-500 gpm.). Finally, when on RHR, the reactor shutdown margin is small (typically about 1%).

A further consideration in generating a response to a boron dilution event when the reactor is subcritical is that the Nuclear Regulatory Commission has required that 15 minutes be allowed for response by the operator to an alarm. In the case of an automatic response, only sufficient time for the system to initiate a response need be provided. In either case, however, detection of the event must be early enough that action can be taken, whether manually or automatically, to prevent the reactor from going critical.

Some of the factors that must be considered in responding to an event leading to an inadvertent return to criticality are illustrated by FIG. 2 which is a plot of the neutron flux versus time for a typical approach to criticality assuming constant positive reactivity insertion, which would occur for instance during an inadvertent boron dilution event. As can be seen from the plot, the function is basically exponential with a slow rise in flux early in the event followed by rapidly increasing flux leading to criticality. While selection of a large change in flux for use in triggering an alarm will obviously distinguish an inadvertent approach to criticality from the expected condition of continued subcritical operation, such a change in flux does not occur until late in the event and therefore would not allow sufficient time to initiate action which would prevent the reactor from going critical. This is particularly true in the case of manual response where the NRC has required that it be assumed that the operator takes no action until 15 minutes after the generation of the alarm. A somewhat smaller change in flux will be detected earlier in the event, however, it is possible that during the extended time period required for such a change in the flux, parameters such as the reactor coolant system temperature could change due to system heatup or cooldown thereby complicating the calculations. On the other hand, if the selected change in flux used to trigger the alarm is too small, spurious alarms could be generated in view of the low signal to noise ratio and the random nature at low count rates of the neutron flux signal used to measure reactor shutdown margin.

Other factors to consider in generating the alarm for an inadvertent approach to criticality are the capabilities of the primary grade water pump 31, the charging pumps 35, the number and makeup of the charging pumps operable when on RHR and the reactor shutdown margins. From these, it was determined that the potential exists to inject as much as 400–500 gpm. of clean water from the boron control system into the reactor core.

Returning to FIG. 2, point A represents the reactivity of the reactor at some point in the event. The location of this point on the curve is related to the shutdown margin of the reactor and the time into the event. It was postulated from the considerations above that a suitable technique for detecting an inadvertent approach to criticality would be to select a multiplication factor for the flux count rate which would occur in the area of the point B shown on the curve. Empirical analysis revealed that an increase in the flux count rate by a factor of 2 within a ten minute period would provide this response. Such a response allows the detection of events with a reactor period (the time required for the reactivity to increase by a factor of e) as long as approximately 800 seconds.

Selection of a doubling of the flux count rate in 10 minutes as a criteria for detecting an inadvertent approach to criticality was then examined in light of the NRC time criteria. To do this, inverse count rate ratio (ICRR) versus reactor coolant system boron concentration ($C_B$) plots for several existing plants were converted to ICRR versus time curves for a group of dilution rates, initially 10, 5 and 2.5 ppm/min. The ICRR versus time data was then plotted as a family of curves based upon dilution rate for each of the plants from which data was taken (2 two-loop, 2 three-loop and 2 four-loop plants, resulting in typical data for both first core and reload criticality approaches). Using these plots it was verified that an alarm on flux doubling could be used to meet the NRC time criteria. Critical parameters used at this point were boron worth and shutdown margin. It was determined that boron worths of 14 pcm/ppm and 12.5 pcm/ppm (depending on RCS temperature) appear to be reasonably conservative. These were used to determine starting points on the curves at shutdown margins of 1, 1.6, 1.77 and 2.0% $\Delta K/K$ (typical shutdown margin requirements for the steam break transient or at cold conditions).

Assuming that different shutdown margins, the time from doubling of the flux to criticality was determined and compared to the NRC criteria for each of the three dilution rates. As a result of these comparisons it was concluded that the following limits are necessary:

Category 1 Plants—Plants with Automatic System Response

Hot Standby and Hot Shutdown—shutdown margin $\geq 1.6\%$ $\Delta K/K$ dilution rate $\leq 20.0$ ppm/min.

Cold Shutdown—shutdown margin $\geq 1.0\%$ $\Delta K/K$ dilution rate $\leq 20.0$ ppm/min.

Category 2 Plants—Plants with Operator Response after alarm

Hot Standby and Hot Shutdown (if not on RHR)—shutdown margin $\geq 1.6\%$ $\Delta K/K$ 4-loop 1.77% $\Delta K/K$ 3-loop 2.0% $\Delta K/K$ 2-loop dilution rate $\leq 3.0$ ppm/min.

Cold Shutdown and Hot Shutdown (if not RHR)—shutdown margin $\geq 1.6\%$ $\Delta K/K$ 4-loop 1.77% $\Delta K/K$ 3-loop 2.0% $\Delta K/K$ 2-loop dilution rate $\leq 2.5$ ppm/min.

The dilution rates shown above are the maximum inadvertent dilution rates which can be detected in time to meet the NRC time criteria for the various conditions indicated. The dilution rates shown for category 1 plants result in initiating system response about 2 to 3 minutes prior to criticality. This is sufficient time for automatic response in the manner described below. The dilution rates for category 2 plants results in an alarm approximately 17–18 minutes prior to criticality allowing the operator time to take corrective action. The investigation also showed that while a doubling of the flux count rate in 10 minutes is the preferred criteria for detecting an inadvertent approach to criticality, multiplication factors between about 1.5 and 3.0 and time intervals of about 5 to 20 minutes provide satisfactory results.

Measurement of the neutron flux, which is an indication of the status of the shutdown margin of the reactor, is carried out by the nuclear instrumentation system. Because the neutron flux varies by a factor of about 11 decades, from cold shutdown to full power, the nuclear instrumentation system is divided into three sets of instruments, each adapted to provide an indication of neutron flux in a specific band of reactor power. The source range instrumentation covers the low end of the scale from about $10^{-9}$ percent power up to about $10^{-4}$ percent, the intermediate range instrumentation provides the readings from about $10^{-4}$ percent power up to about $10^{0}$ percent power and the power range instrumentation takes over above $10^{0}$ percent power (with approximately two decades of overlap between ranges). The source range instrumentation includes a BF$_3$ (boron trifluoride) neutron detector located in concrete shielding adjacent to the reactor vessel. Each neutron transiting the gas filled tube of the BF$_3$ detector generates a pulse. As shown in the schematic diagram of FIG. 3, the detector 63 is connected to a preamplifier 65 which converts the pulses into an analog signal which is amplified in an amplifier 67 calibrated to produce a logarithmic output. This much of the neutron flux measuring system is already provided in the plant for use in monitoring and controlling the operation of the reactor.

As discussed earlier, there are several problems with using this signal for early detection of an inadvertent approach to criticality. First, the detector 63 generates pulses and the statistics of the pulse signal generated are very poor at the low count rates encountered when the reactor is shutdown or in hot standby. Second, the signal from the preamplifier 65 is very noisy. Finally, the long time constant expected for the event combined with the logarithmic calibration of amplifier 67 means that the change in the magnitude of the output signal during the early phases of the event will be small over long periods of time. In order to avoid spurious alarms, it is therefore necessary to select a multiplication factor lage enough to overcome these difficulties, keeping in mind that too large a multiplicaton factor will generate an alarm too late in the event as mentioned above. These considerations were a factor in selecting a multiplication factor between 1.5 and 3.0 and preferably about 2.

In order to overcome the shortcomings of the neutron flux count rate signal generated at the output of amplifier 67, it was determined that an average flux count rate signal representative of the average flux count rate over an incremental time period should be generated for each point in time at which a flux count rate signal is needed. The average flux count rate signals are generated by sampling the analog flux count rate signal at a number of instants during each incremental time period, generating a running total of the magnitude of the signal during each instant and then dividing this total by the number of instants sampled. For convenience and to decrease the significance of signal noise, the incremental time period was selected as one minute which fits in nicely with the 10 minutes interval selected for doubling of the flux count rate signal.

Currently available microcomputers are ideal for generating the average flux count rate signal and an alarm upon an increase in this signal by the selected multiplication factor in the selected time interval. Their flexibility also allows for modification of the selected parameters if desired with a minimum of effort. In the specific embodiment of the invention which has been developed, a microcomputer unit 69, shown in FIG. 3, samples the analog flux count rate signal from the amplifier 67 and converts it to a digital signal for calculating the average value 4096 times each minute, or once every 14.64 microseconds. The number of samples averaged into the calculation of the average flux count rate signal is not fixed but should be sufficiently large to assure a representative result.

The microcomputer unit 69 repetitively and continuously generates an average neutron flux count rate signal each minute and stores the last ten values in a queue. At the end of each minute, the latest value of the average neutron flux count rate signal is compared with the value generated 10 minutes earlier and if it has increased by the selected multiplication factor, an alarm is generated. In the preferred embodiment of the invention, this latest value is also compared with the stored value for each of the last 10 minutes with an alarm being generated if it exceeds any one of them by the selected multiplication factor. This provides earlier generation of an alarm for very large rates of dilution and also provides better protection following a reactor trip. The latter can be better understood by reference to FIG. 4 which is a plot of a typical neutron flux decay as a function of time following a reactor trip. As can be seen, the neutron flux drops exponentially and at, for instance, one hour following the trip there is still some rate of decay. Thus over a 10 minute period for example, the latest average flux signal would be less than the earlier signal under normal circumstances. Therefore, conditions which could lead to an inadvertent approach to criticality would not be detected until a very advanced stage in the event. On the other hand, comparing the latest average flux count rate signal with the corresponding signal for each of the last 10 minutes would generate an alarm much sooner. In fact, it has been determined that the present invention will detect an inadvertent boron dilution event within the time criteria specified by the NRC at least within one hour following a reactor trip.

Returning to FIG. 3, any alarm signal generated by the microcomputer unit 69 is applied to a protection system 71 which presents an indication of the alarm to the operator, and for an automatic response, generates signals which energize the motor operators to close the chemical and volume control system valves 39, and open the refueling water storage tank valves 55. In most cases, this fully terminates the flow of diluted water to the reactor and introduces the highly borated water from the refueling water storage tank into the reactor coolant system to assure that the reactor remains subcritical. All of this, including purging the lines to the reactor coolant system of clean water, occurs within about two to three minutes of the generation of the alarm by the microcomputer unit. If the source of diluting water is through manually operated valve 61, which for some reason has been disturbed from its normally closed position, operation of the automatic system will not terminat the flow, however, the size of the line 59, compared to those coming from the RWST, is small such that the highly borated refueling water remains effective to keep the reactor subcritical. The system illustrated in FIG. 3 is one of two identical, redundant systems which assure protection from an inadvertent approach to criticality event.

Figure 3:
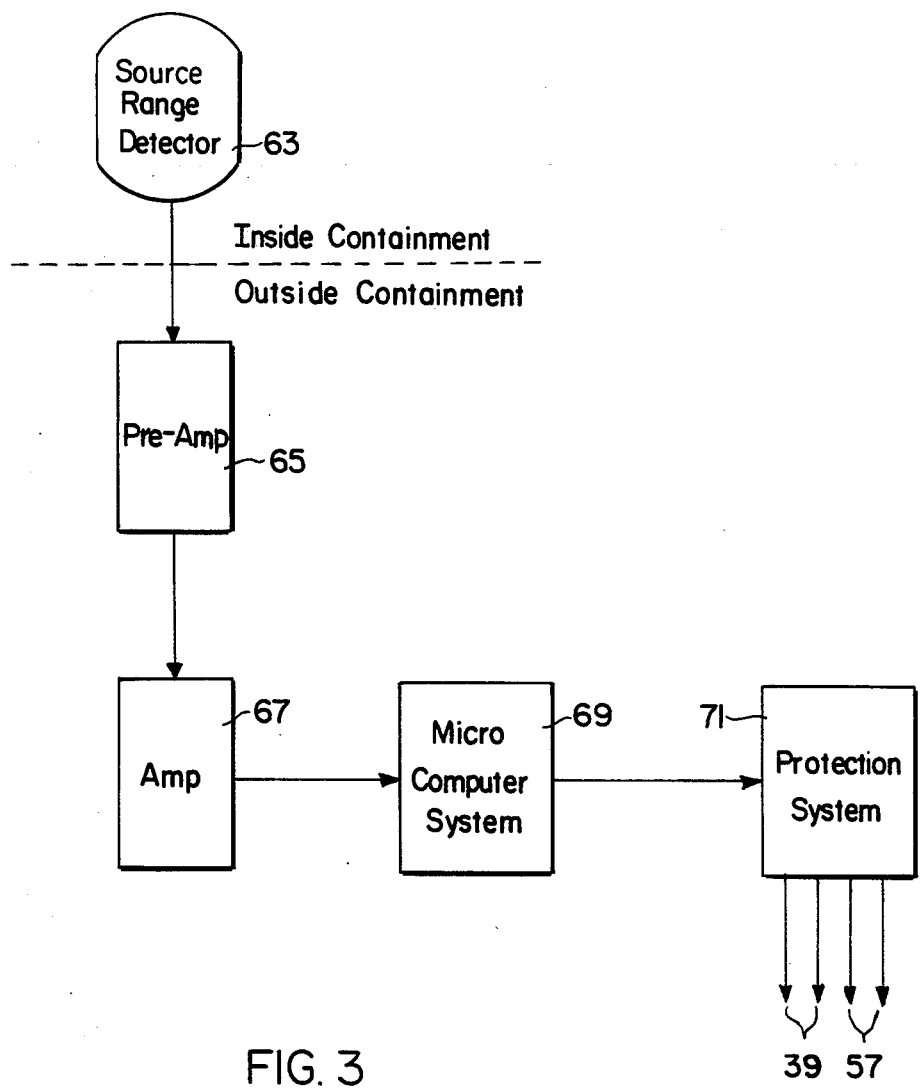
FIG. 3 is a schematic diagram in block form of a system according to the invention for detecting an inadvertent approach to criticality in the reactor unit illustrated in FIG. 1.
Figure 5:
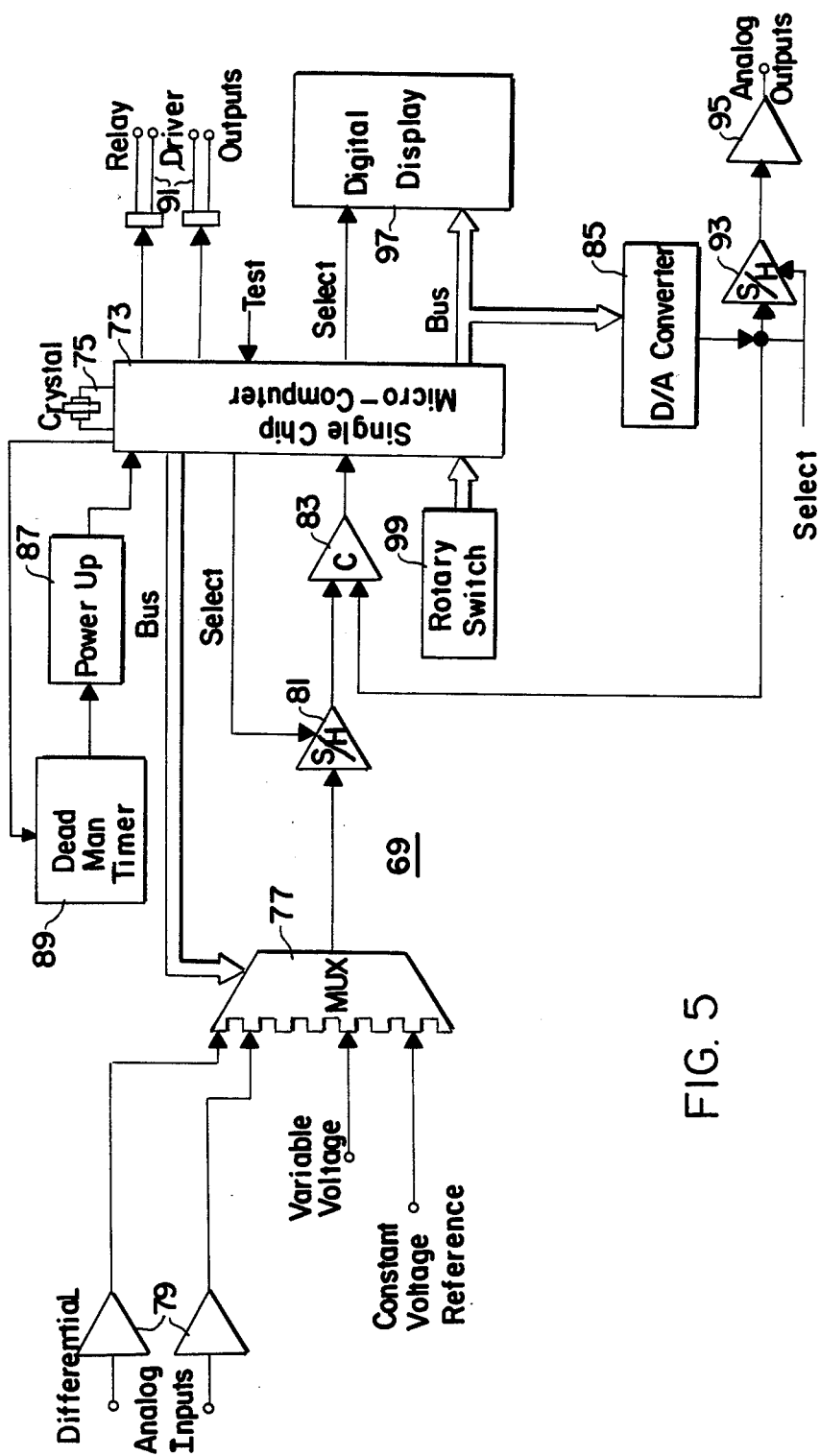
FIG. 5 is a schematic diagram of a microcomputer system according to the invention suitable for use in the system of FIG. 3.

The microcomputer unit 69 of FIG. 3 is shown in more detail in FIG. 5. The heart of the unit is a single chip microcomputer 73 which contains a central processing unit, a programmable read only memory (PROM) for the program instructions, a random access memory (RAM) for data memory, parallel input/output hardware and a hardware timer. All operations of the microprocessor unit 69 including the control of all peripherals and all computations are controlled by the microcomputer 73. Its actions are the result of executing a fixed set of instructions detailed below which are stored in its nonvolatile PROM. Examples of suitable microcomputers for use with the invention are the Intel 8748, 8749 or 8751 depending upon the amounts of ROM, RAM and the length of the instruction set required. A 8748 was used in the initial unit. A crystal 75 provides the timing pulses for the microcomputer.

The microprocessor unit 69 includes an input multiplexer 77 which selects, under the control of the microcomputer, the outside signal to be inputted to the microcomputer. The inputs are the differential analog flux count rate signal from the amplifier 67, a source range off/on signal which indicates whether the source range instrumentation is in use, a variable voltage which represents the multiplication factor to be used in comparing successive values of the flux count rate signal and a constant voltage used for calibration as discussed below. The analog flux count rate signal which varies between 0 and 10 volts and the off/on signal which is either 0 or 10 volts are both applied to the multiplexer through input amplifiers 79. This variable voltage can be adjusted to vary the multiplication factor over the range of about 1.5 to 3.0. Since the analog flux count rate signal is logarithmic, the multiplication factor can be applied to the earlier average flux count rate signals by adding it to the stored values when comparing them with the latest value.

The selected input signal is applied to the microcomputer through a sample and hold circuit 81 and a comparator 83. These components together with an output digital to analog converter 85 are used to effect an analog to digital conversion of the input signals for use by the microcomputer. The microcomputer accomplishes the conversion through successive approximation by assuming a digital value for the analog input signal, converting this assumed value to an analog signal in converter 85 and comparing it in comparator 83 with the analog signal stored in sample and hold circuit 81. The assumed value is adjusted up or down depending upon whether the analog signal is larger or smaller respectively than the previously assumed value, and the cycle is repeated until the assumed value converges on the analog input signal value.

The microcomputer unit 69 also includes a power up circuit 87 which provides an initializing signal to the microcomputer 73 and a deadman timer 89. The deadman timer is reset each time the alarm generating program is run by the microcomputer. If the microcomputer accidentally gets into an unknown state due to noise on the power lines or any other unforeseen conditions so that the alarm generating program is not run repetitively as it is designed to run, the deadman timer 89 will time out and send a signal to the power up circuit 87 to reinitialize the microcomputer.

The primary output of the microcomputer 73 is a pair of relay drivers 91 which are de-energized when an alarm signal is generated by the microcomputer to signal the protection system 71 (FIG. 3) that an inadvertent approach to criticality event is in progress. A second output is provided through the D/A converter 85, sample and hold circuit 93, and output amplifier 95. The analog signal at this output represents the difference between the value of the latest average flux count rate signal and the stored value from 10 minutes earlier. The microcomputer unit 69 also includes a local digital display 97. A sixteen position rotary switch 99 determines the information to be displayed. The choice of displays includes: the analog inputs, the number of average samples stored (up to ten), the position within the one minute averaging period, some of the one minute average values and a blank to turn off the display. The position of switch 99 also determines what diagnostic tests are to be performed by the microcomputer.

Figure 6:
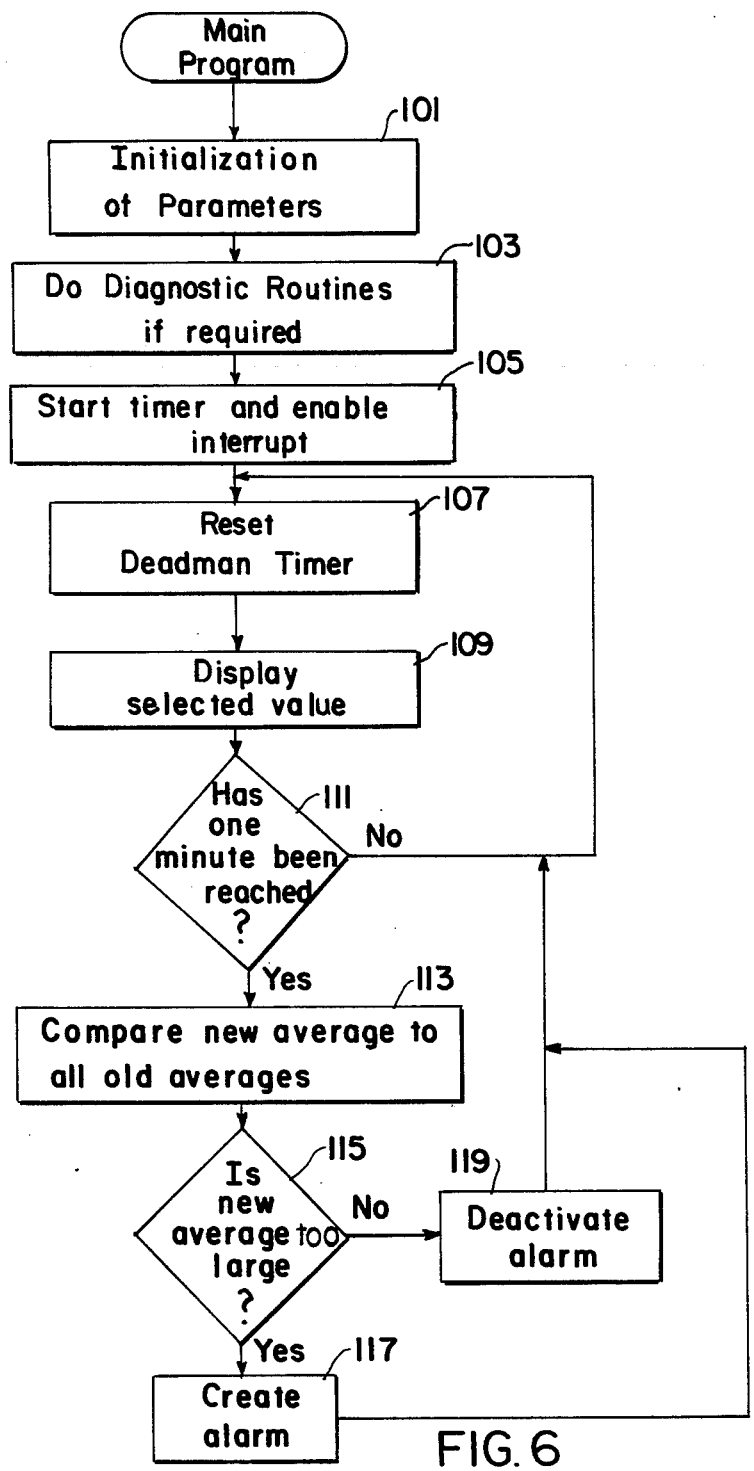
FIGS. 6 and 7 are flow charts setting forth a suitable program for operating the microcomputer system of FIG. 5 in accordance with the teachings of the invention.
Figure 7:
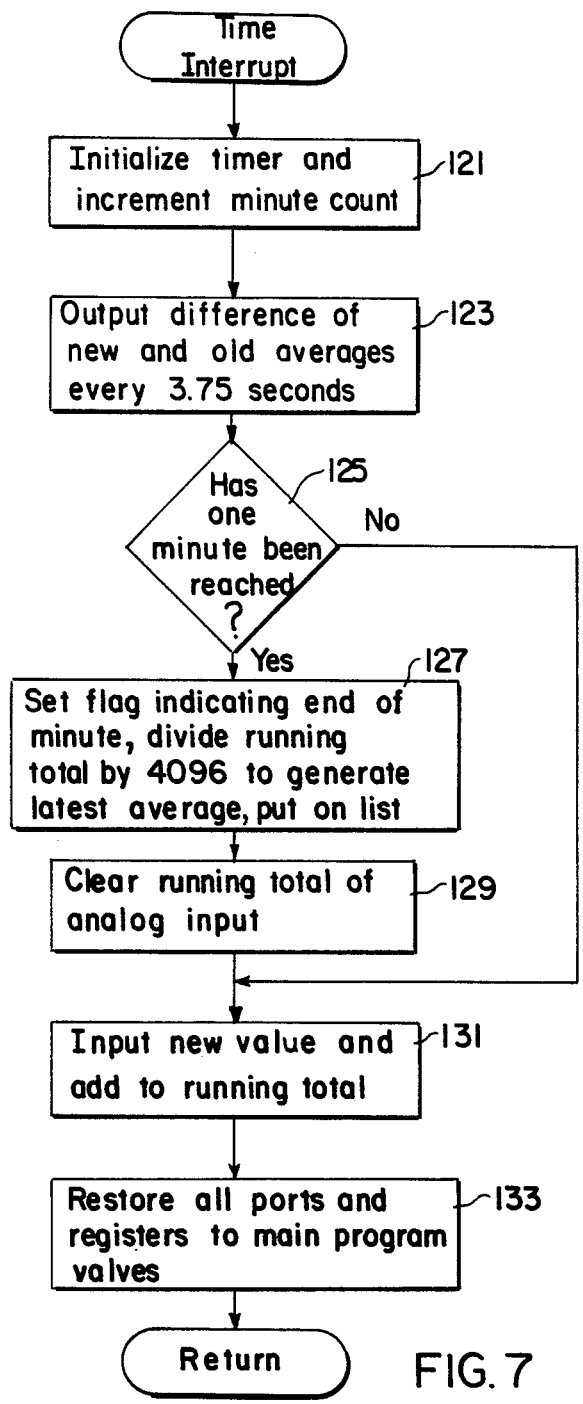

The above discussed functions assigned to the microcomputer 23 are carried out by the algorithm illustrated in the flow charges of FIGS. 6 and 7. The algorithm is divided into two major sections: the main routine which initializes the meter and then enters an infinite loop, and the time interrupt routine which interrupts the main routine every 14.64 m sec. (4069 times each minute) to keep track of time and to gather samples in creating the average input voltage. The main program as shown in the flow chart of FIG. 6 begins in response from a signal from the power up module 87 in FIG. 5 by initializing parameters as indicated in block 101. This initialization includes: clearing a running total of the flux count rate signal input samples, setting the one minute counter location to one minute, setting to zero a flag indicating that one minute is up, clearing a pointer from the bottom of the list of stored one minute average values and setting the output to indicate no alarm until enough data has been analyzed to determine the true condition. Next the main program initiates some diagnostic routines, if required, as indicated in block 103. The only diagnostic check made when the system is on line is a check of the calibration of the digital to analog conversion. This check is made by comparing the converted value of the constant voltage applied to the last analog input of the multiplexer with a stored value for that voltage. The difference is applied to all analog input signals as an offset. Other diagnostic tests performed off line, include droop tests for the sample and hold circuits and a staircase diagnostic routine which checks the firmware digital to analog conversion. Initialization is completed by starting the timer for the interrupt program and enabling the interrupt as shown in block 105.

Following initialization, the main program of FIG. 5 enters an infinite loop by resetting the deadman timer in block 107. As indicated earlier, the time set in the deadman timer exceeds by a considerable amount the time required for each repetition of the infinite loop so that normally the deadman timer never times out. If, however, for some reason the program becomes hung up, the deadman timer will time out and reinitialize the main program in the manner discussed earlier. After setting the deadman timer, the values selected by the rotary switch 99 (see FIG. 5) are displayed in the local digital display 97 as indicated by block 109. Next a check is made in block 111 to see if one minute has elapsed yet. This one minute is the time interval over which the interrupt program gathers data for generating the average neutron flux count rate signals. If one minute is not up, the main program returns to block 107 and resets the deadman timer to start the loop over again. If one minute has elapsed, the latest average neutron flux count rate signal is compared with each of the stored earlier average value signals. After the first minute of operation, only one average signal is available and no comparison can be made. With each additional minute of operation, another average value signal becomes available for comparison until 10 earlier values are retained. If the latest average neutron flux count rate signal exceeds any of the available old averages by the selected multiplication factor or more, as determined in block 115, an alarm is created in block 117 by deactivating the relay driver outputs 91 of the microcomputer. If the latest average value signal is smaller than all of the old values multiplied by the multiplication factor, the alarm is deactivated in block 119 by applying a voltage to the relay drivers. In either case, the main program returns to block 107 to start another repetition of the infinite loop. Since the analog flux count rate signals used by the microcomputer in making the average flux count rate signals are logarithmic, the multiplication can be easily carried out by adding the log of the multiplication factor to each of the old values.

Every 14.64 milliseconds, when the microcomputer's internal timer times out, the time interrupt program of FIG. 7 is entered whereupon the timer is reinitialized and the minute counter is incremented all as indicated in block 121. The difference between the latest average value and the oldest stored average value is then outputted through the D/A converter 85 to the sample and hold circuit 93 every 3.75 seconds as shown in block 123. If one minute has elapsed when checked in block 125, a flag is set in block 127 indicating the end of the minute and the running total accumulated over the last minute is divided by 4096, the number of samples totaled, to arrive at the latest average value of the flux count signal. This latest average value is then inserted at the top of the list with each of the other entries being moved downward one position and the oldest value being discarded. Upon completion of these steps, the running total is cleared in block 129 in preparation for the calculation of the next one minute average.

Whether or not the minute was up when checked in block 125, the new instantaneous value of the analog flux count rate signal is inputted to the microcomputer in block 131 and added to the running total. This requires use of the analog to digital firmware conversion, and therefore use of registers and ports in the microcomputer associated with the conversion in the manner discussed above. Since the main program also uses the digital to analog conversion firmware in generating indications on the local digital display 97 of the various input signals when selected by the rotary switch 99, it is necessary to store the contents of the registers and the outputs used by the main program when interrupted by the time interrupt routine. Hence the time interrupt routine restores all ports and registers to the main program values in block 133 before returning to the main program.

Thus, the present invention monitors the neutron flux count rate signal, generates one minute average flux count rate signals, stores them for ten minutes, compares the latest average value with each of the stored values and generates an alarm if the latest average value exceeds any of the stored values by more than a preset multiplication factor. The technique described for the use of a microcomputer overcomes the shortcomings of the statistically poor, and inherently noisy, signal generated by the source range neutron flux detector. The microcomputer also allows for adjustment of the multiplication factor merely by adjusting the magnitude of the input reference voltage and the other parameters can be modified by straightforward adjustments in the program.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of detecting an inadvertent approach to criticality in a nuclear fueled electric power generating unit comprising the steps of:

generating an instantaneous neutron flux count rate signal representative of the instantaneous neutron flux in the reactor at a level of reactivity of about $10^{-4}$ percent reactor power and below;

generating from the instantaneous neutron flux count rate signal first and second average flux count rate signals representative of the average neutron flux count rate signal over first and second incremental time periods spaced apart in time by a preset time interval including sampling the instantaneous neutron flux count rate signal repetitively during said incremental time periods and generating said first and second average flux count rate signals as the average of the samples taken during the respective intervals; and comparing said first and second average flux count rate signals and generating an alarm when the second average flux count rate signal exceeds the first average flux count rate signal by at least a preselected multiplication factor.

2. The method of claim 1 wherein said preselected time interval is a multiple of said incremental period and including the steps of repetitively and continuously generating said average flux count rate signals, storing the latest such signals equal in number to said multiple and selecting as said second average flux count rate signal the latest such signal generated.

3. The method of claim 2 wherein said latest average flux count rate signal is compared to each of said stored average flux count rate signals and said alarm signal is generated when it exceeds any one of said stored average flux count rate signals by at least said multiplication factor.

4. A method of detecting and responding to unintended dilution of the borated water in a pressurized water reactor, electric power generating unit in which the borated water in the reactor coolant system is diluted during normal operation said method comprising the steps of:

generating an instantaneous neutron flux count rate signal representative of the instantaneous neutron flux in the reactor at a level of reactivity of about $10^{-4}$ percent reactor power and below;

repetitively generating from the instantaneous neutron flux count rate signal a series of average flux count rate signals representative of the average value of the instantaneous flux count rate signal over repetitive incremental time periods, including generating a running total of the value of said instantaneous neutron flux count rate signal at a plurality of equally spaced instants during each incremental time period and dividing the running total by the number of said plurality of instants;

storing each of said average flux count rate signals for a preset time interval;

comparing the latest average flux count rate signal with the oldest and generating an alarm signal when said latest average flux count rate signal exceeds the oldest stored average flux count rate signal by at least a preselected multiplication factor; and introducing into the reactor coolant system borated water at a concentration which prevents the reactor from going critical.

5. The method of claim 4 wherein said latest average flux count rate signal is compared with each of said stored average flux count rate signals and said alarm signal is generated when it exceeds any one of said stored average flux count rate signals by at least said multiplication factor.

6. The method of claim 1, 3, 4 or 5 wherein the multiplication factor is between about 1.5 and 3.0.

7. The method of claim 6 wherein said preset time interval is about 5 to 20 minutes.

8. The method of claim 7 wherein said multiplication factor is about 2.

9. The method of claim 8 wherein said preset time interval is about 10 minutes.

10. The method of claim 1, 3, 4 or 5 wherein said incremental time period is about one minute.

11. The method of claim 10 wherein said preset time interval is between about 5 and 20 minutes.

12. The method of claim 11 wherein said preset time interval is about 10 minutes.

13. The method of claim 12 wherein said multiplication factor is about 1.5 to 3.0.

14. The method of claim 13 wherein said multiplication factor is about 2.

15. The method of claim 4 wherein the reactor unit includes a first borated water supply system having a first valve through which borated water of a regulated concentration is introduced into the reactor coolant system during normal operation of the reactor and a second borated water supply system having a second valve through which borated water at a concentration which prevents the reactor from going critical is introduced into the reactor coolant system and wherein said first valve is open and the second is closed during normal reactor operation and wherein the step of introducing borated water to prevent the reactor from going critical includes the steps of closing the first valve and opening the second valve in response to said alarm signal.

16. Apparatus for detecting an inadvertent approach to criticality of a shutdown nuclear reactor comprising:
means for measuring the reactor neutron flux and for generating an instantaneous neutron flux count rate signal at a level of reactivity of about $10^{-4}$ percent reactor power and below; and
alarm generating means responsive to the instantaneous neutron flux count rate signal for repetitively generating average neutron flux count rate signals for consecutive incremental time periods by sampling said instantaneous neutron flux count rate signal at a plurality of instants in time during each incremental time period, summing the sampled values of said instantaneous neutron flux count rate signal over said incremental time period and dividing by the number of samples, for storing each of the average neutron flux count rate signals for a predetermined time interval, for comparing the latest such signal with the stored signal representative of the average neutron flux count rate during the incremental period occuring said predetermined interval earlier and for generating an alarm signal when the latest signal exceeds the earlier signal at least by a preset multiplication factor.

17. The apparatus of claim 16 wherein the reactor is a pressurized water reactor having a reactor coolant system in which borated water is circulated to control reactor reactivity and including means for generating a first supply of borated water at controlled boron concentrations and a second supply of borated water at a boron concentration which will maintain the reactor in a subcritical state, first valve means through which said first supply of borated water of controlled concentration is introduced into the reactor coolant system, and second valve means through which said second supply of borated water at a concentration which maintains the reactor in a subcritical state is introduced into the reactor coolant system in response to said alarm.

18. The apparatus of claim 17 including alarm responsive means which automatically closes said first valve means and opens the second valve means to introduce said borated water at a concentration which will maintain the reactor in a subcritical state into the reactor coolant system in response to said alarm signal.

19. The apparatus of any claim 16, 17 and 18 wherein said alarm generating means compares the latest average neutron flux count rate signal with each of the stored signals and generates said alarm signal when it exceeds any one of the stored signals at least by said multiplication factor.

* * * * *